United States Patent
Choi (10) Patent No.: US 8,900,535 B2
(45) Date of Patent: Dec. 2, 2014

(54) PRODUCTION OF ZINC SULPHATE CONCENTRATES FROM A DILUTE ZINC SULPHATE SOLUTION

(75) Inventor: Yeonuk Choi, Oakville (CA)

(73) Assignee: Barrick Gold Corporation, Toronto, Ontario (CA)

( * ) Notice: Subject to any disclaimer, the term of this patent is extended or adjusted under 35 U.S.C. 154(b) by 356 days.

(21) Appl. No.: 12/986,898

(22) Filed: Jan. 7, 2011

(65) Prior Publication Data

US 2011/0165059 A1   Jul. 7, 2011

Related U.S. Application Data

(60) Provisional application No. 61/293,100, filed on Jan. 7, 2010.

(51) Int. Cl.

| | |
|---|---|
| C01G 9/00 | (2006.01) |
| C01B 17/96 | (2006.01) |
| C01F 11/46 | (2006.01) |
| C21B 3/02 | (2006.01) |
| C21B 11/10 | (2006.01) |
| C22B 19/20 | (2006.01) |
| C22B 19/00 | (2006.01) |
| C01G 9/02 | (2006.01) |
| C01G 9/06 | (2006.01) |

(52) U.S. Cl.
CPC . *C01F 11/46* (2013.01); *C01G 9/02* (2013.01); *C01G 9/06* (2013.01)
USPC ............ 423/101; 423/544; 423/555; 75/324; 75/10.3; 75/431; 75/654

(58) Field of Classification Search
None
See application file for complete search history.

(56) References Cited

U.S. PATENT DOCUMENTS

| | | | |
|---|---|---|---|
| 2,996,440 A * | 8/1961 | Forward et al. ............... | 205/607 |
| 3,421,850 A | 1/1969 | Peterson et al. | |
| 3,656,941 A | 4/1972 | Matthew et al. | |
| 3,954,937 A | 5/1976 | Bodson | |
| 3,964,901 A | 6/1976 | Swinkels et al. | |
| 3,976,743 A | 8/1976 | Landucci et al. | |

(Continued)

FOREIGN PATENT DOCUMENTS

| | | |
|---|---|---|
| CA | 2147554 | 10/1996 |
| EP | 0262964 | 4/1988 |

(Continued)

OTHER PUBLICATIONS

"Hydroxide Precipitation," Hoffland Environmental Inc., as early as Nov. 2006, <http://hoffland.net/src/tks/3.xml>, 3 pages.

(Continued)

*Primary Examiner* — Melvin C Mayes
*Assistant Examiner* — Sheng H Davis
(74) *Attorney, Agent, or Firm* — Sheridan Ross P.C.

(57) ABSTRACT

In an embodiment, the present invention relates to an apparatus and a process for producing a concentrated form of basic zinc sulphate from a, typically dilute, acidic zinc sulphate-bearing solution. The process embodiment comprises the steps of precipitating the zinc, preferably primarily as basic zinc sulphate, from the acidic zinc sulphate solution, preferably using calcium oxide, in such a way as to promote the formation of separate gypsum crystals and basic zinc sulphate particles, and upgrading the zinc content in the precipitates by separating the basic zinc sulphate from the gypsum using size separation techniques.

24 Claims, 1 Drawing Sheet

(56) References Cited

U.S. PATENT DOCUMENTS

| | | | |
|---|---|---|---|
| 4,024,218 A | 5/1977 | McKay et al. | |
| 4,049,770 A | 9/1977 | Swinkels et al. | |
| 4,073,860 A | 2/1978 | Huggins et al. | |
| 4,405,570 A | 9/1983 | Van der Meulen et al. | |
| 4,557,908 A * | 12/1985 | Laveyne et al. | 423/164 |
| 4,572,822 A | 2/1986 | Abe et al. | |
| 4,619,814 A | 10/1986 | Salter et al. | |
| 4,889,694 A | 12/1989 | Spink et al. | |
| 4,992,248 A | 2/1991 | Watanabe et al. | |
| 5,380,354 A | 1/1995 | Chalkley et al. | |
| 5,484,579 A * | 1/1996 | O'Brien | 423/36 |
| 5,585,079 A | 12/1996 | Fugleberg | |
| 5,587,079 A | 12/1996 | Rowley et al. | |
| 5,762,807 A | 6/1998 | Straten | |
| 6,103,204 A | 8/2000 | Lizama et al. | |
| 6,153,108 A | 11/2000 | Klock et al. | |
| 6,395,242 B1 | 5/2002 | Allen et al. | |
| 6,726,889 B2 | 4/2004 | Choi et al. | |
| 6,843,976 B2 | 1/2005 | Allen et al. | |
| 6,991,593 B2 | 1/2006 | Price et al. | |
| 7,018,605 B2 | 3/2006 | Kobayashi et al. | |
| 7,862,786 B2 | 1/2011 | Choi et al. | |
| 2002/0094564 A1 | 7/2002 | Banfield et al. | |
| 2003/0031611 A1 * | 2/2003 | Choi et al. | 422/187 |

FOREIGN PATENT DOCUMENTS

| | | |
|---|---|---|
| GB | 138948 | 2/1920 |
| JP | 63-45130 | 2/1988 |
| JP | 2002-121624 | 4/2002 |

OTHER PUBLICATIONS

"Precipitation—General Discussion and Theory," Chapter 2 of Engineering and Design—Precipitation/Coagulation/Flocculation, vol. EM 1110-1-4012, Nov. 15, 2001, pp. 1-7 <http://140.194.76.129/publications/eng-manuals/em1110-1-4012/chap2.pdf>.

Amer, S., "Treating Metal Finishing Wastewater," Aquachem Inc., Enviromental Technology, Mar./Apr. 1998, 7 pages.

Ayres et al., "Removing Heavy Metals from Wastewater," Engineering Research Center Report, University of Maryland, Aug. 1994, pp. 1-21.

Habashi, F., "Hydrolytic and Ionic Precipitation," Chapter 24 of A Textbook of Hydrometallurgy, Metallurgie Extractive Quebec, Sainte-Foy, Quebec, Jul. 1999, pp. 563-601.

Jacobs, "In-Situ Remediation of Heavy Metals," Fast-Tek, Internet, Nov. 21, 2007, <http://www.fast-tek.com/TM107.pdf>, 2 pages.

Pugsley et al., "Removal of Heavy Metals from Mine Drainage in Colorado by Precipitation," Chem. Eng. Prog. Symposium Series 107, 1970, vol. 67, pp. 75-89.

Tabak et al., "Advances in biotreatment of acid mine drainage and biorecovery of metals: 1. Metal precipitation for recovery and recycle," Biodegradation, 2003, vol. 14, pp. 423-436.

Background of the Invention for the above-captioned invention filed Jan. 7, 2011 (previously provided).

* cited by examiner

PRODUCTION OF ZINC SULPHATE CONCENTRATES FROM A DILUTE ZINC SULPHATE SOLUTION

CROSS REFERENCE TO RELATED APPLICATION

The present application claims the benefits of U.S. Provisional Application Ser. No. 61/293,100, filed Jan. 7, 2010, having the same title, which is incorporated herein by this reference in its entirety.

FIELD

The invention relates generally to the recovery of zinc and particularly to the recovery of zinc from zinc sulphate solutions.

BACKGROUND

Many types of zinc ores can be readily dissolved in sulphuric acid, either directly, or after pre-treatment, such as concentration through flotation followed by oxidation, to render the zinc more amenable to leaching. The leaching of these ores, including the pre-treatment and the removal of impurities, such as silica and iron, for disposal and the recovery of valuable metals associated with the zinc in the ore, such as copper, by precipitation using zinc dust additions, is well established.

Although there are many processes that can provide a method to dissolve the zinc from acid soluble ores and other sources, or that can generate secondary streams of dilute acidic zinc bearing solutions, none of the processes provide a versatile and cost-effective process for the recovery of zinc. The most common method for the recovery of zinc from a zinc sulphate solution is by the conventional zinc electrowinning process. It requires considerable capital investment and may not be a suitable process to install at the location where the dilute acidic zinc solution is available or where sufficient energy is unavailable or expensive. To compete commercially, an electrolytic zinc plant requires some strategic advantage. This advantage may be derived due to its large scale, low capital costs or mostly depreciated capital cost, a location close to zinc markets and with good infrastructure, labour costs that are lower than its competitors and a large labour pool from which to draw, or a low cost ample supply of electricity. Many low grade sources of zinc that can be leached to form a dilute acidic zinc sulphate solution are not available in quantities that would justify a large electrolytic zinc plant. A large labour pool or ample electricity at competitive rates for electrolysis may not be available at the site where a leachable zinc deposit is found. As well, it may be possible to separate a secondary stream of zinc-bearing solution from a process in quantities that do not justify an electrolytic zinc plant or at a location that is inappropriate to install a zinc electrolysis operation for one or more of the reasons cited.

A zinc sulphate solution can be concentrated slightly by several known methods, such as solvent extraction or ion exchange. The primary limitation of these processes is that they still require a conventional zinc electrowinning process to recover the zinc from the resulting concentrated zinc sulphate solution and to regenerate the acid that is required to strip the zinc from the solvent or ion exchange resin.

Another approach to recover zinc from the dilute zinc bearing solution is to precipitate the zinc from the solution. The recovered zinc can be sent to a zinc refinery for further processing and recovery. Zinc can be recovered from a zinc sulphate solution by adding an alkaline agent to produce zinc oxide, zinc hydroxide, or basic zinc sulphate. Zinc can also be precipitated form a zinc sulphate solution by adding a sulphide to produce zinc sulphide. Similarly, zinc can be precipitated as zinc carbonate by adding a carbon dioxide or a carbonate.

When precipitating zinc as zinc hydroxide, basic zinc sulphate or zinc oxide, usually the preferred alkaline agent is calcium oxide or hydrated lime, calcium hydroxide, because it is more readily available and less expensive than other alkaline reagents. When using calcium oxide as the alkaline agent, the resulting zinc-bearing precipitate is highly diluted by the associated gypsum which is generated by the reaction of calcium oxide and sulphate in the dilute acidic solution. Another alkaline source could be used, such as sodium hydroxide, but these are very expensive and would make the recovery of zinc uneconomic. For these reasons the recovery of zinc by precipitation with calcium oxide to produce zinc hydroxide, basic zinc sulphate, or zinc oxide is usually associated with an electrolytic zinc plant where the zinc in the resulting precipitate is re-leached to separate it from the gypsum without the expense of drying and transporting such a low grade zinc intermediate product.

A higher grade and transportable zinc sulphide precipitate can be produced from a dilute zinc sulphate solution by introducing a sulphide or carbon oxide. These sulphides can be either purchased, such as sodium hydrosulphide, or generated on site, such as hydrogen sulphide, which is usually generated by bacteriological processes. In all cases, the sulphide source is expensive and, if other sulphide consuming metals are present in the dilute zinc sulphide solution, they will consume sulfidizing reagent and render the process uneconomic. Similarly, the reagents required to produce a zinc carbonate precipitate are very expensive so that it would not be economic to recover the zinc by such a process.

As well as a solution produced by the leaching of zinc ores, there are many sources of dissolved zinc generated by secondary process or effluent streams from processes. The most common is the production of a dilute acidic zinc sulphate bearing solution generated by acid mine drainage, or the contaminated acidic water which drains form the tailings impoundment areas of zinc mines. This acidic water is usually collected and sent to on-site effluent treatment plants where it is neutralised with calcium oxide to remove the zinc and other heavy metals. These effluent streams may also be treated with a sulphide, such as hydrogen sulphide, to recover a saleable zinc sulphide product.

U.S. Pat. No. 6,726,889 B2 describes a process to overcome the fact that the resulting zinc precipitate is very low grade when the zinc is removed from the dilute sulphate solution by the addition of calcium oxide. This process involves the use of conditions that favour the production of zinc oxide, rather than basic zinc sulphate during the precipitation of the zinc form the dilute zinc sulphate solution. These conditions include a temperature of 95° C., which is some 30° C. higher than the temperature required for the precipitation of basic zinc sulphate. Also the pH required to favour the formation of zinc oxide is approximately pH 10 while virtually all of the zinc can be precipitated from a dilute sulphate solution at a pH of approximately pH 6.5. The precipitation reaction for basic zinc sulphate requires less neutralising agent than is required for the precipitation of zinc oxide. The additional cost for heating and neutralising the dilute solution beyond what would be required for precipitating all of the zinc as zinc oxide rather than basic zinc sulphate is substantial.

Therefore, it is desirable to develop a process for the production of basic zinc sulphate from a dilute zinc sulphate solution to produce a relatively pure basic zinc sulphate and avoid the dilution of the zinc precipitate by the co-precipitated gypsum.

SUMMARY

These and other needs are addressed by the various embodiments and configurations of the present invention. The invention is directed generally to the removal of dissolved zinc from an acidic, oxyanion-containing solution.

In one embodiment, a method and apparatus are provided for the recovery of dissolved zinc from an acidic zinc sulphate-containing solution through a process of pH adjustment using an alkaline agent to precipitate the dissolved zinc, primarily as zinc sulphate, and upgrade of the zinc content of the precipitates by granulometric sizing. The zinc sulphate is typically precipitated as a basic salt, and the alkaline agent is preferably one or more of calcium oxide and calcium hydroxide.

Dissolved zinc is precipitated primarily as a zinc sulphate rather than zinc oxide or hydroxide through pH and temperature control. At higher pH's and solution temperatures, zinc oxide and hydroxide precipitates are favored while at lower pH's and solution temperatures zinc sulphate precipitates are favored.

The present invention can provide a number of advantages depending on the particular configuration. By way of example, the dramatic particle size differences between the precipitated zinc salt and gypsum ($CaSO_4$) can provide a highly effective and selective separation of zinc and therefore an economic process for zinc recovery. The process can recover zinc without the energy, capital investment, operating cost, and other demands of electrowinning. The process of the present invention can require little capital investment and low operating costs while being readily scalable to accommodate small or large amounts of acidic zinc-containing solutions. The process can use relatively inexpensive and widely available alkaline agents, such as slaked and burnt lime. The process can effect zinc precipitation at lower pH's and solution temperatures than processes precipitating zinc as an oxide or hydroxide. The process allows for the recovery of other metals, such as copper, nickel, cobalt, lead, and silver.

These and other advantages will be apparent from the disclosure of the invention(s) contained herein.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "zinc sulphate" or "zinc sulfate" is an anhydrous or hydrated, colorless, crystalline, and water-soluble chemical compound having the formula $ZnSO_4$.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

BRIEF DESCRIPTION OF THE DRAWING

The accompanying drawing is incorporated into and forms a part of the specification to illustrate several examples of the present invention(s). This drawing together with the description, explain the principles of the invention(s). The drawing simply illustrates preferred and alternative examples of how the invention(s) can be made and used and are not to be construed as limiting the invention(s) to only the illustrated and described examples. Further features and advantages will become apparent from the following, more detailed, description of the various embodiments of the invention(s), as illustrated by the drawing referenced below.

DETAILED DESCRIPTION

In one embodiment, the present invention relates to a method and apparatus for the recovery of zinc from an acidic zinc sulphate solution through a process of precipitating of zinc, preferably as zinc sulphate, and upgrading the zinc content of the precipitates, preferably by granulometric sizing. The process can produce a zinc sulphate product having a zinc content up to approximately 50%.

In one process configuration, the method and apparatus produces the concentrated form of zinc sulphate from a dilute acidic zinc sulphate-bearing solution. The configuration comprises the steps of precipitating the zinc, primarily as basic zinc sulphate, using an alkaline reagent, which is preferably calcium oxide (CaO) (e.g., burnt lime) or hydroxide ($Ca(OH)_2$) (e.g., slaked lime), in such a way as to promote the formation of separate gypsum ($CaSO_4$) crystals and basic zinc sulphate particles, and upgrading the zinc content in the precipitates by separating the basic zinc sulphate from the gypsum using size separation techniques.

Figure 1:
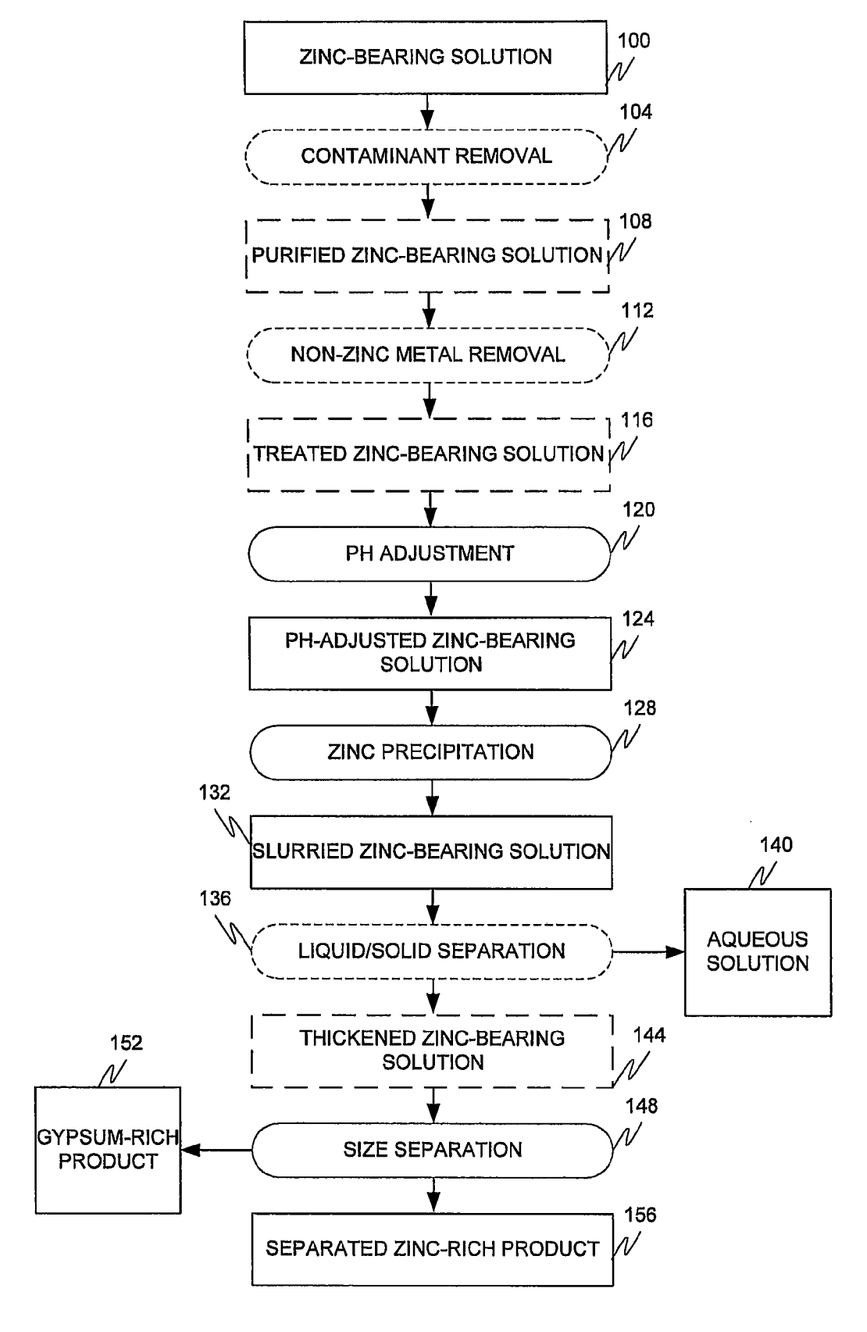
FIG. 1 depicts a process embodiment according to an embodiment of the present invention.

An embodiment of the process will be discussed with reference to FIG. 1.

The zinc-bearing solution 100 can be from any source. The solution 100 can be naturally generated, such as acid mine drainage, or synthetically generated, such as a solution from processing ore, concentrate, tailings, or other mine, or metallurgical residue. Examples of synthetic solutions include pregnant or barren leach solutions, barren or pregnant electrolytic solutions, raffinate solutions, elution solutions, and the like. In one configuration, the solution 100 is generated by sulphuric acid leaching a silicate, oxide, carbonate, and/or sulphide ore. The ore typically contains other metals, such as gold, silver, cobalt, nickel, copper, iron, cadmium, manganese, and magnesium. The pH of the solution 100 typically ranges from about pH 1.0 to about pH 6.

The zinc-bearing solution 100 is optionally subjected to selective impurity removal in step 104 by a removal agent when the solution contains dissolved impurities, such as iron, silica, and other metals (e.g., aluminum, arsenic, antimony, and the like), to remove, by oxidation or partial neutralization, at least most of the impurities and form a purified zinc-bearing solution 108. In one configuration, a neutralizing agent, such as calcium oxide or hydroxide, MgO, or ZnO, precipitates the impurities as oxides.

In optional step 112, other dissolved non-zinc metals, such as copper, cadmium, cobalt, and nickel, are selectively removed and recovered by a suitable technique to form a treated zinc-bearing solution 116. In one configuration, the remaining metals are removed by cementation, preferably using zinc dust with or without other reagent such as copper sulphate, arsenic trioxide and/or antimony. The preferred pH is in the range of about pH 3 to pH 5.

In both of optional steps 104 and 112, most of the dissolved zinc remains dissolved in solution; that is, little, if any, dissolved zinc is removed from solution. The pH of the pulp after one or both of steps 104 and 112 is preferably below about pH 6.5 to maintain the dissolved zinc in solution.

The pulp leaving either steps 104 or 112 contains suspended solids and is subjected to solid/liquid separation (not shown), such as by using a thickening process or conventional filtering technology.

The zinc-bearing solution 100, purified zinc-bearing solution 108, or treated zinc-bearing solution 116, depending on which, if any, of steps 104 and 112 is performed, is pH adjusted in step 120 by addition of an alkaline agent to form a pH-adjusted zinc-bearing solution 124 and, in step 132, the zinc precipitated to form a slurried zinc-bearing solution 132. Careful control of the pH and solution temperature controls the composition of the precipitates and the selectivity of the separation. The pH of the solution is raised by addition of the alkaline agent, which is preferably calcium oxide or hydrated lime in solution, to yield a preferred pH in the range of about pH 5 to pH 14 and more preferably in the range of about pH 6 to about pH 10 to precipitate only zinc or optionally zinc along with manganese, magnesium, and other dissolved metals. At higher pH's and temperatures, substantially all of the dissolved metal values, including zinc, are co-precipitated as sulphates, oxides, and/or hydroxides while at lower pH's and temperatures substantially all of the zinc precipitates as a sulphate, oxide, and/or hydroxide but most of the remaining metals remain dissolved in solution. When the alkaline agent is slaked or burnt lime, all or a major part of the lime is converted to gypsum.

In a preferred process configuration, the pH is adjusted to a pH in the preferred range of about pH 5.5 to pH 8.0, more preferably in the range of about pH 5.5 to about pH 7.5, and even more preferably in the range of about pH 5.5 to about pH 6.5, at a preferred solution temperature of no more than about 95° C., more preferably no more than about 75° C., even more preferably no more than about 70° C., even more preferably no more than about 65° C., and even more preferably less than about 60° C. to precipitate at least most, more preferably at least about 65%, and even more typically at least about 75% of the dissolved zinc precipitates as basic zinc sulphate while the remaining zinc precipitates as zinc hydroxide and/or zinc oxide. As noted, at least most and more preferably at least about 75% of the calcium in the lime precipitates as gypsum.

Although the pH adjusting and zinc precipitating steps 116 and 128 can occur in different vessels, a preferred system includes a precipitation unit, where the dilute acidic zinc sulphate solution is continuously introduced while the pH in the precipitation unit is controlled by the addition of the alkaline agent. At the same time, the temperature of the precipitation unit is controlled to produce a temperature typically greater than about 30° C. but less than the preferred maximum temperature indicated above, as is the normal practice for the precipitation of basic zinc sulphate and gypsum. Like zinc hydroxide and zinc oxide, basic zinc sulphate precipitates as a fine solid with mean, median, and $P_{90}$ particle sizes generally less than about 50 microns, even more generally no more than about 25 microns, and even more generally no more than about 10 microns. Conversely, gypsum precipitates as a crystalline needle-like solid that can grow to much larger sizes than the basic zinc sulphate. Generally, the mean, median, and $P_{90}$ particle sizes of gypsum is more than about 50 microns, even more generally more than about 75 microns, even more preferably more than about 100 microns, and even more preferably more than about 150 microns. Due to the differences in particle sizes, precipitated basic zinc sulphate solids are separated readily from the gypsum solids by granulometric sizing or other size separation techniques.

In optional step 136, the slurried zinc-bearing solution 132 is optionally subjected to liquid/solid separation to form a thickened zinc-bearing solution 144 of increased solids density or loading and an aqueous solution 140 comprising at most only a small fraction of the zinc precipitates. The aqueous solution 140 can be further treated for metal recovery and/or recycled, as appropriate.

In step 148, the slurried zinc-bearing solution 132 or thickened zinc-bearing solution 144 is subjected to size separation to form a separated zinc-rich product 156 and a gypsum-rich product 152. The size separation may be performed by any method, either individually or in various combinations. For example, sizing may be performed by using one or more of the following techniques: classification, elutriation, settling, screening, tables, and cyclones. Cyclones are devices used for the separation of solids from liquids or fine particles or high density particles from coarse or low density particles respectively. Since such separation depends on relative particle size and specific gravity, it can be used for separation of solids. Alternatively, size separation may be effected by a (wet or dry) screening technology that uses appropriate sieves.

In one configuration, the precipitated slurry is wet-screened with a series of sieves and the undersized materials are collected as a final product. The oversized materials are collected and recycled to a leaching or neutralisation step. Also, the oversized material is leached with sulphuric acid to recover co-precipitated zinc compound. The zinc bearing solution is then recycled to the basic zinc sulphate precipitation stage to recover zinc. The leached residue can be washed and recovered as pure gypsum. The undersized materials can also be treated further by granulometric operation, as described in the previous sections, to increase zinc grade.

The size separation is selective. Typically, at least about 35%, even more typically at least about 40%, even more typically at least about 45%, and even more typically at least about 50% of the dissolved zinc in the zinc-bearing solution 100 is in the separated zinc-rich product 156; typically at least about 25%, even more typically at least about 35%, and even more typically at least about 45% of the precipitated zinc sulphate in the slurried zinc-bearing solution 132 is in the separated zinc-rich product; and typically at least about 50%, even more typically at least about 60%, even more typically at least about 70%, and even more typically at least about 85% of the gypsum in the slurried zinc-bearing solution 132 is in the gypsum-rich product 152. The separated zinc-rich product 156 commonly includes at least about 25 wt. %, even more preferably at least about 35 wt. %, and even more commonly at least about 40 wt. % zinc sulphate.

The gypsum-rich tailings from the separation step can be returned to a preceding zinc leaching step to recover the zinc value.

EXPERIMENTAL

The following examples are provided to illustrate certain embodiments of the invention and are not to be construed as limitations on the invention, as set forth in the appended claims. All parts and percentages are by weight unless otherwise specified.

Example 1

Production of Zinc Sulfate at 65° C.

A slightly acidic dilute solution of zinc sulphate was continuously fed into a series of four agitated precipitation reactors which cascaded from reactor #1 to reactor #4. The key elements in the zinc sulphate solution employed are shown in Table 1.

TABLE 1

| Feed Solution analysis | |
|---|---|
| Element | Concentration |
| Zinc | 1380 ppm |
| Magnesium | 50 ppm |
| Manganese | 18 ppm |
| pH | 4-5 |

The temperature in the reactors was maintained between 60° C. and 70° C. with a target of 65° C. The pH in the four precipitation reactors was controlled between pH 5.5 and pH 7.5 with a target of pH 6.5 by the addition of lime. The flow rate of the feed solution was kept constant at 2.5 liters per minute so that the total retention time in the four precipitation reactors was 60 minutes, to precipitate basic zinc sulfate. The lime consumption was between 2.0 and 2.5 Kg/tonne of solid feed. No gypsum seed crystals were fed to the precipitation reactors.

After achieving steady state, the slurry discharge from the fourth precipitation reactor was collected for settling, analysis, wet screening, and cyclone testing. Under these conditions and those employed in the subsequent examples, virtually all of the zinc in the feed solution reported to the precipitated solids. The grade of the solids precipitated was approximately 34% zinc and 10% calcium.

These solids were thickened and wet screened with mesh sizes of +53 microns, +38 microns, +25 microns and −25 microns. Each screen fraction was vacuum filtered, oven dried and assayed. The results are summarized in Table 2.

TABLE 2

Grade and recovery of wet screened zinc products from reactor operated at 65° C., pH 6.5 without seeding

| Size | Mass | Grade % | % Recovery | | | |
|---|---|---|---|---|---|---|
| (microns) | Fraction % | Zn | Zn | Ca | Mg | Mn |
| +53 | 24.91 | 1.10 | 0.8 | 55.4 | 4.5 | 0.6 |
| −53-+38 | 9.31 | 5.36 | 1.5 | 19.0 | 3.0 | 1.0 |
| −38-+25 | 2.46 | 13.72 | 1.0 | 4.2 | 1.6 | 0.7 |
| −25 | 63.32 | 50.03 | 96.6 | 21.4 | 90.9 | 97.7 |
| Total | 100 | | 100 | 100 | 100 | 100 |

The −25 micron fraction representing 63% of the total weight of precipitated solids with a zinc grade of 50% represented 96.6% of the zinc contained in the precipitated solids. The −25 mesh fraction also contained 21.4% of the precipitated calcium and 90.9% magnesium, and 97.7% of the manganese.

TABLE 3

Molar ratio of contaminants to zinc of various size fractions of wet screened zinc products from reactor operated at 65° C., pH 6.5 without seeding

| | Molar Ratio | | |
|---|---|---|---|
| Size (micron) | Ca:Zn | Mg:Zn | Mn:Zn |
| +53 | 35.3 | 0.236 | 0.075 |
| −53-+38 | 24.5 | 0.130 | 0.034 |
| −38-+25 | 9.1 | 0.084 | 0.031 |
| −25 | 0.2 | 0.027 | 0.026 |
| Total | | | |

The molar ratios of the contaminants in the precipitated zinc product are shown in Table 3, and generally, the contaminant to zinc ratios are lowest in the −25 mesh fraction and increase with particle size.

Pumping the discharge slurry through a cyclone gave similar results. The slurry was pumped through a 25 mm diameter cyclone at 20 psi inlet pressure. A single cyclone separation stage was used. The overflow and underflow samples were collected, filtered dried, weighed and assayed. The solids in the cyclone overflow gave a zinc grade of 42% with a zinc recovery to the over flow of 69%. The solids in the cyclone underflow gave a zinc grade of 47.2% with a zinc recovery to the over flow of 79.7%.

Example 2

Production of Zinc Sulfate at 55° C.\

The same sample solution employed in Example 1 was processed in the same manner as example 1 except that the temperature was lowered to 55° C.

The wet screening results gave a slightly lower zinc recovery, 87% and a lower grade, 45% zinc.

The bulk precipitate contained 31.78% zinc and 9.59% calcium. The results in Table 4 show that when the product was screened at −25 mesh that 98.6% of the zinc product was recovered at a grade of 42.18%, which is significantly lower than the grade of 50% reported in example 1. The results indicate that even though zinc recovery may be slightly higher at lower temperatures, the grade of the final product is lower. This is due to the higher recovery of calcium in the fine product (39.3% at 55° C. and 21.4% at 65° C.). The same trend with decreased temperature is observed when the cyclone results at 65° C. and 55° C. are compared; zinc grade drops slightly from 47.2 to 45% while the zinc recovery increases from 79.7% to 87%.

TABLE 4

Grade and recovery of wet screened zinc products from reactor operated at 55° C., pH 6.5 without seeding

| Size | Mass | Grade % | % Recovery | | | |
|---|---|---|---|---|---|---|
| (micron) | Fraction % | Zinc | Zn | Ca | Mg | Mn |
| +53 | 16.13 | 0.98 | 0.5 | 33.5 | 4.3 | 1.5 |
| −53-+38 | 10.31 | 1.41 | 0.5 | 21.4 | 2.2 | 0.6 |

TABLE 4-continued

Grade and recovery of wet screened zinc products from
reactor operated at 55° C., pH 6.5 without seeding

| Size | Mass | Grade % | % Recovery | | | |
|---|---|---|---|---|---|---|
| (micron) | Fraction % | Zinc | Zn | Ca | Mg | Mn |
| −38-+25 | 2.92 | 3.68 | 0.4 | 5.9 | 1.0 | 0.4 |
| −25 | 70.64 | 42.18 | 98.6 | 39.3 | 92.5 | 97.4 |
| Total | 100 | | 100 | 100 | 100 | 100 |

Example 3

Production of Zinc Oxide at 65° C.

The same solution employed in example 1 was processed in the same manner as Example 1 except lime was added to maintain a pH of pH 10. The zinc precipitation product is therefore zinc oxide rather than basic zinc sulphate, as produced in Examples 1 and 2.

The grade of the solids precipitated was approximately 27.28% zinc and 14.88% calcium, and was lower than that observed in Examples 1 and 2. After wet screening, the −25 mesh fraction exhibited a lower zinc grade of 44% than observed in Example 1 (50%) and zinc recovery increased to 99%, as shown in Table 5.

TABLE 5

Grade and recovery of wet screened zinc products from
reactor operated at 65° C., pH 10 without seeding

| Size | Mass | Grade % | % Recovery | | | |
|---|---|---|---|---|---|---|
| (micron) | Fraction % | Zn | Zn | Ca | Mg | Mn |
| +53 | 6.73 | 1.15 | 0.2 | 13.9 | 0.4 | 0.2 |
| −53-+38 | 7.54 | 2.85 | 0.6 | 15.2 | 0.6 | 0.6 |
| −38-+25 | 2.88 | 4.11 | 0.3 | 5.7 | 0.4 | 0.3 |
| −25 | 82.85 | 43.94 | 98.9 | 65.2 | 98.6 | 98.8 |
| Total | 100 | | 100 | 100 | 100 | 100 |

Compared to the molar ratios for the −25 mesh zinc product produced in Example 1, the calcium to zinc molar ratio increase from 0.2 to 0.3, while the magnesium to zinc ratio increases from 0.027 to 0.112, as shown in Table 6.

TABLE 6

Molar ratio of contaminants to zinc of various size fractions of wet
screened zinc products from reactor operated at 65° C., pH 10 without
seeding

| Size | Mass | Molar Ratio | | |
|---|---|---|---|---|
| (microns) | Fraction % | Ca:Zn | Mg:Zn | Mn:Zn |
| +53 | 6.73 | 29.3 | 0.207 | 0.028 |
| −53-+38 | 7.54 | 11.5 | 0.124 | 0.027 |
| −38-+25 | 2.88 | 7.8 | 0.133 | 0.027 |
| −25 | 82.85 | 0.3 | 0.112 | 0.026 |
| Total | 100 | | | |

Example 4

Production of Zinc Oxide at 65° C., with Seeding

The same solution employed in Example 1 was processed in the same manner as Example 1 except the pH was controlled with a target of 10 with lime, and recycled gypsum seed crystals were introduced to the precipitation reactor to provide nucleation sites for gypsum crystal growth. The zinc precipitation product is therefore zinc oxide rather than basic zinc sulphate, as produced in Examples 1 and 2.

After wet screening the grade of the fines was found to be significantly lower than Example 1 at approximately 20% and zinc recovery to the −25 mesh fraction was 87%, as shown in Table 7.

TABLE 7

Grade and recovery of wet screened zinc products from
reactor operated at 65° C., pH 10 with seeding

| Size | Mass | Grade % | % Recovery | | | |
|---|---|---|---|---|---|---|
| (microns) | Fraction % | Zn | Zn | Ca | Mg | Mn |
| +53 | 15.76 | 1.66 | 2.6 | 18.5 | 5.7 | 3.6 |
| −53-+38 | 34.54 | 2.09 | 7.1 | 40.1 | 7.6 | 7.5 |
| −38-+25 | 5.14 | 5.08 | 2.6 | 5.8 | 2.3 | 2.3 |
| −25 | 44.56 | 20.15 | 87.8 | 35.6 | 84.4 | 86.6 |
| Total | 100 | | 100 | 100 | 100 | 100 |

Compared to the ratios for the −25 mesh zinc product produced in Example 1, the calcium-to-zinc molar ratio increased from 0.2 to 1.2, while the magnesium to zinc ratio increased from 0.027 to 0.134. (Table 8).

TABLE 8

Molar ratio of contaminants to zinc of various size fraction of wet
screened zinc products from reactor operated at 65° C., pH 10 without
seeding

| Size | Mass | Molar Ratio | | |
|---|---|---|---|---|
| (microns) | Fraction % | Ca:Zn | Mg:Zn | Mn:Zn |
| +53 | 15.8 | 21.9 | 0.313 | 0.039 |
| −53-+38 | 34.5 | 17.2 | 0.149 | 0.030 |
| −38-+25 | 5.1 | 6.9 | 0.125 | 0.025 |
| −25 | 44.6 | 1.2 | 0.134 | 0.028 |
| Total | 100 | | | |

The above examples indicate that a higher grade zinc precipitation product can be produced using basic zinc sulphate precipitation rather than zinc oxide precipitation.

Example 5

Production of Basic Zinc Sulfate at 35° C.

A slightly acidic dilute solution of zinc sulphate was continuously fed into a series of four agitated precipitation reactors which cascaded to a single reactor. The key elements in the zinc sulphate solution employed are shown in Table 9.

TABLE 9

Feed Solution analysis

| Element | Concentration |
|---|---|
| Zinc | 2069 ppm |
| Magnesium | 54 ppm |
| Manganese | 17 ppm |
| pH | 4-25 |

The temperature was maintained at an average temperature of 35.1° C. and the pH was increased and maintained at a pH of pH 6.5-pH 6.6 throughout the test by the addition of a 50 g/L lime slurry. The residence time in the reactor was 1 hour. The treated slurry was then separated by wet screening at 25 microns. The zinc grade and recovery in the −25 micron fraction was 43.7%, and 86% respectively. This example shows that high grade (89%) BZS can be recovered using a reaction temperature of 35° C.

The final filtrate contains 43.9 ppm magnesium and 11.12 ppm manganese, compared to 54 ppm magnesium and 17 ppm manganese in the feed solution, illustrating that the majority of these elements remained in solution.

A number of variations and modifications of the invention can be used. It would be possible to provide for some features of the invention without providing others.

For example in one alternative embodiment, mineral acids other than sulfuric acid are used to dissolve zinc from a zinc-containing material. A polyatomic anion-containing salt of the acid is precipitated by gypsum. The polyatomic anion is preferably an oxyanion or oxoanion. As will be appreciated, an oxyanion is a negatively charged polyatomic ion that contains oxygen. For example, the precipitated zinc salt of hydrochloric acid will be zinc chlorate ($Zn(ClO_3)_2$) (in which the polyatomic anion is chlorate) and the calcium salt will be calcium chlorate ($Ca(ClO_3)_2$), and the zinc salt of nitric acid will be zinc nitrate ($Zn(NO_3)_2$) (in which the polyatomic anion is nitrate) and the calcium salt of nitric acid will be calcium nitrate ($Ca(NO_3)_2$). The zinc salt may be a basic, neutral, or acid salt.

In another alternative embodiment, the basic zinc sulphate is separated from gypsum by flotation techniques. The separation can be effected using suitable collectors and frothers. Flotation may be performed independently or collectively with granulometric size separation.

In another embodiment, the alkaline agent is a material other than lime, such as an alkali or alkaline earth metal oxide or hydroxide, such as sodium or potassium oxide or hydroxide.

The present invention, in various embodiments, configurations, or aspects, includes components, methods, processes, systems and/or apparatus substantially as depicted and described herein, including various embodiments, configurations, aspects, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   contacting an acidic zinc- and sulphate-bearing solution comprising dissolved zinc with a calcium oxide and/or hydroxide to adjust a pH of the acidic zinc- and sulphate-bearing solution to a pH ranging from about pH 5 to about pH 14 at a temperature of the acidic zinc- and sulphate-bearing solution of greater than about 30° C. but no more than about 95° C. to precipitate at least most of the zinc as zinc sulphate and at least most of the calcium oxide and/or hydroxide as gypsum, wherein the precipitated zinc sulphate has at least one of a mean, median, and $P_{90}$ particle size less than about 50 microns and the gypsum has at least one of a mean, median, and $P_{90}$ particle size of more than about 50 microns; and
   size separating the precipitated zinc sulphate from the gypsum to form a zinc sulphate-rich product and a gypsum-rich product, wherein at least about 35% of the dissolved zinc is in the zinc sulphate-rich product and at least about 50% of the gypsum is in the gypsum-rich product.

2. The method of claim 1, wherein the pH of the acidic zinc- and sulphate-bearing solution is adjusted to a pH ranging from about pH 5.5 to about pH 8.0, wherein the temperature of the acidic zinc- and sulphate-bearing solution is no more than about 75° C., wherein the precipitated zinc sulphate particles have at least one of a mean, median, and $P_{90}$ particle size no more than about 25 microns, wherein the gypsum particles have at least one of a mean, median, and $P_{90}$ particle size of more than about 75 microns, and wherein the separation of zinc sulphate from gypsum is performed by granulometric sizing.

3. The method of claim 2, wherein the adjusted pH is in the range of from about pH 5.5 to about pH 7.5 and the solution temperature is no more than about 65° C.

4. The method of claim 3, wherein the adjusted pH is in the range of from about pH 5.5 to about pH 6.5 and wherein the solution temperature is less than about 60° C.

5. The method of claim 1, wherein the pH of the acidic zinc- and sulphate-bearing solution is adjusted to a pH ranging from about pH 6 to about pH 10 and wherein at least about 65% of the dissolved zinc precipitates as basic zinc sulphate and at least about 75% of the calcium in the calcium oxide and/or hydroxide precipitates as gypsum.

6. The method of claim 1, wherein the pH of the acidic zinc- and sulphate-bearing solution is adjusted to a pH ranging from about pH 6 to about pH 10 and wherein at least about 40 wt. % of the dissolved zinc is in the zinc sulphate-rich product and wherein at least about 25% of the precipitated zinc sulphate is in the zinc sulphate-rich product.

7. The method of claim 6, wherein at least about 60% of the gypsum is in the gypsum-rich product and wherein the zinc sulphate-rich product comprises at least about 25 wt. % zinc.

8. The method of claim 1, further comprising, before the contacting step:
- precipitating at least most of any dissolved iron and silica; and
- removing at least most of any copper, cadmium, cobalt, and nickel to form the acidic zinc- and sulphate-bearing solution, wherein at least most of the zinc remains dissolved in the acidic zinc- and sulphate-bearing solution.

9. The method of claim 1, wherein the solution comprises dissolved manganese and magnesium and wherein, in the contacting step, at least most of the manganese and magnesium is maintained dissolved in solution.

10. The method of claim 1, wherein the solution comprises dissolved manganese and/or magnesium and wherein, in the contacting step, at least most of the manganese and/or magnesium is co-precipitated with the zinc sulphate.

11. The method of claim 1, wherein the separating step is performed by at least one of classification, elutriation, gravity settling, screening, a table, and a cyclone and wherein at least a portion of the gypsum-rich product is at least one of recycled to the contacting step or recycled to a leaching step.

12. A method, comprising:
- contacting an acidic zinc- and sulphate-bearing solution comprising dissolved zinc with a calcium oxide and/or hydroxide to adjust the pH of the acidic zinc- and sulphate-bearing solution to a pH ranging from about pH 5.5 to about pH 8.0 at a temperature of the acidic zinc- and sulphate-bearing solution of greater than about 30° C. but no more than about 75° C. to precipitate at least most of the zinc as zinc sulphate and at least most of the calcium oxide and/or hydroxide as gypsum, wherein the precipitated zinc sulphate has at least one of a mean, median, and $P_{90}$ particle size of no more than about 25 microns and the gypsum has at least one of a mean, median, and $P_{90}$ particle size of more than about 75 microns; and
- size separating at least about 25% of the precipitated zinc sulphate from the gypsum to form a zinc sulphate-rich product and a gypsum-rich product, wherein at least about 40% of the dissolved zinc is in the zinc sulphate-rich product and at least about 60% of the gypsum is in the gypsum-rich product.

13. The method of claim 12, wherein the acidic zinc- and sulphate-bearing solution comprises a mineral acid, wherein the precipitated zinc sulphate particles have at least one of a mean, median, and $P_{90}$ particle size of no more than about 25 microns, wherein the gypsum particles have at least one of a mean, median, and $P_{90}$ particle size of more than about 100 microns, and wherein the separation of the zinc salt from calcium salt is performed by granulometric sizing.

14. The method of claim 12, wherein the acidic zinc- and sulphate-bearing solution comprises sulfuric acid, wherein the precipitated zinc sulphate particles have at least one of a mean, median, and $P_{90}$ particle size of no more than about 10 microns, wherein the gypsum particles have at least one of a mean, median, and $P_{90}$ particle size of more than about 150 microns, and wherein the contacting step is performed at a pH in the range of from about pH 5.5 to about pH 7.5 and a solution temperature of no more than about 65° C.

15. The method of claim 14, wherein the solution temperature is less than about 60° C.

16. The method of claim 14, wherein the solution comprises a mineral acid, wherein at least about 45 wt. % of the dissolved zinc is in the zinc sulphate-rich product, and wherein at least about 35% of the precipitated zinc sulphate is in the zinc sulphate-rich product.

17. The method of claim 16, wherein at least about 85% of the gypsum is in the gypsum-rich product and wherein the zinc sulphate-rich product comprises at least about 35 wt. % zinc.

18. The method of claim 12, wherein the solution comprises a mineral acid and wherein at least about 65% of the dissolved zinc precipitates as zinc sulphate and at least about 75% of the calcium in the calcium oxide and/or hydroxide precipitates as gypsum.

19. The method of claim 12, further comprising, before the contacting step:
- precipitating at least most of any dissolved iron and silica; and
- removing at least most of any copper, cadmium, cobalt, and nickel to form the acidic zinc- and sulphate-bearing solution, wherein at least most of the zinc remains dissolved in the acidic zinc- and sulphate-bearing solution.

20. The method of claim 12, wherein the acidic zinc- and sulphate-bearing solution comprises dissolved manganese and/or magnesium and wherein, in the contacting step, at least most of the manganese and magnesium is maintained dissolved in solution.

21. The method of claim 12, wherein the acidic zinc- and sulphate-bearing solution comprises dissolved manganese and/or magnesium and wherein, in the contacting step, at least most of the manganese and/or magnesium is co-precipitated with the zinc sulphate.

22. The method of claim 12, wherein the separating step is performed by at least one of classification, elutriation, gravity settling, screening, a table, and a cyclone and wherein at least a portion of the gypsum-rich product is at least one of recycled to the contacting step or recycled to a leaching step.

23. A method, comprising:
- (a) providing an acidic zinc- and sulphate-bearing solution, the solution further comprising one of dissolved silica and iron and one of dissolved copper, cadmium, cobalt, and nickel;
- (b) removing, from the solution, at least most of the one of dissolved silica and iron;
- (c) removing, from the solution, at least most of the one of dissolved copper, cadmium, cobalt, and nickel to form a treated zinc-bearing solution, wherein at least most of the zinc remains dissolved in the treated zinc-bearing solution;
- (d) after steps (b) and (c), contacting the treated zinc-bearing solution with a calcium oxide and/or hydroxide to adjust the pH of the treated zinc-bearing solution to a pH ranging from about pH 6 to about pH 10 at a temperature of the treated zinc-bearing solution of greater than about 30° C. but no more than about 95° C. to precipitate at least most of the zinc as zinc sulphate and at least most of the calcium oxide and/or hydroxide as gypsum, wherein the precipitated zinc sulphate has at least one of a mean, median, and $P_{90}$ particle size less than about 50 microns and the gypsum has at least one of a mean, median, and $P_{90}$ particle size of more than about 50 microns; and
- (e) separating, by a granulometric technique, at least about 25% of the precipitated zinc sulphate from the gypsum to form a zinc sulphate-rich product and a gypsum-rich product, wherein at least about 35% of the dissolved zinc is in the zinc sulphate-rich product and at least about 50% of the gypsum is in the gypsum-rich product.

24. The method of claim 23, wherein:

the precipitated zinc-sulphate particles have at least one of a mean, median, and $P_{90}$ particle size of no more than about 25 microns;

the gypsum particles have at least one of a mean, median, and $P_{90}$ particle size of more than about 75 microns;

the zinc sulphate is precipitated as a basic salt;

the contacting step is performed at a pH in the range of from about pH 5.5 to about pH 7.5 and a solution temperature of less than about 60° C.;

at least about 65% of the dissolved zinc precipitates as zinc sulphate;

at least about 75% of the calcium in the calcium oxide and/or hydroxide precipitates as gypsum;

at least about 50 wt. % of the dissolved zinc is in the zinc sulphate-rich product;

at least about 45% of the precipitated zinc sulphate is in the zinc sulphate-rich product;

at least about 70% of the gypsum is in the gypsum-rich product; and the zinc sulphate-rich product comprises at least about 35 wt. % zinc.

\* \* \* \* \*